United States Patent [19]

Sugimoto et al.

[11] Patent Number: 4,795,894

[45] Date of Patent: Jan. 3, 1989

[54] VISITING CARD MARKED WITH DISCRIMINATING SYMBOLS AND A METHOD OF AND AN APPARATUS FOR READING WHAT IS PRINTED ON SAID VISITING CARD

[75] Inventors: Harue Sugimoto, 4-10-18, Shintakane, Funabashi-shi, Chiba; Akira Sugimoto, Funabashi, both of Japan

[73] Assignee: Harue Sugimoto, Chiba, Japan

[21] Appl. No.: 901,578

[22] Filed: Aug. 29, 1986

[30] Foreign Application Priority Data

Sep. 2, 1985 [JP] Japan ............ 60-133149
May 13, 1986 [JP] Japan ............ 61-107629

[51] Int. Cl.$^4$ ............ G06K 7/10
[52] U.S. Cl. ............ 235/468; 235/487
[58] Field of Search ............ 235/468, 487

[56] References Cited

U.S. PATENT DOCUMENTS

| | | | |
|---|---|---|---|
| 3,621,250 | 11/1971 | Wetzstein | 235/468 |
| 3,666,946 | 5/1972 | Trimble | 235/468 |
| 3,946,203 | 3/1976 | Hecht | 235/468 |
| 4,029,944 | 6/1977 | Trenkamp | 235/468 |
| 4,567,357 | 1/1986 | Fedele | 235/468 |
| 4,588,211 | 5/1986 | Greene | 235/468 |
| 4,605,846 | 8/1986 | Duret | 235/468 |

*Primary Examiner*—Harold I. Pitts
*Attorney, Agent, or Firm*—Burns, Doane, Swecker & Mathis

[57] ABSTRACT

A visiting card of a new type on which symbols, such as characters, mumerals and figures of any kind, for discriminating the bearer's identification items, such as the company name, section name or own name, from other items are marked in the vicinity of the identification items in the margin of the visiting card. Camouflage print may be made on the symbols to conceal them, by the use of a colored/colorless ink, so that they are readable only by an optical reader. The discriminating symbols optically read together with the identification items are converted into binary optical or electric signals and input to a computer in order to obtain a swift, correct and cheap retrieval of the data required.

13 Claims, 5 Drawing Sheets

VISITING CARD MARKED WITH DISCRIMINATING SYMBOLS AND A METHOD OF AND AN APPARATUS FOR READING WHAT IS PRINTED ON SAID VISITING CARD

BACKGROUND OF THE INVENTION

1. Field of the Invention

This invention relates to a visiting card marked with discriminating symbols and a method of and an apparatus for reading what is printed on the visiting card. More particularly, this invention relates to a visiting card with symbols for discriminating each of the bearer's identification items, such as his/her company name, position title or own name, from others, each of the symbols being marked on the right of, the left of, above or below each of the identification items in a corresponding manner on the margin of the visiting card, a method of reading the discriminating symbols and the identification items (hereinafter, occasionally collectively referred to as the information on the visiting card) by an optical means, and an apparatus for use in the embodiment of the method.

2. Description of the Related Arts

Visiting cards are used in almost every country of the world for making self-introductions, for both official and private purposes. Exchanging visiting cards creates a friendly atmosphere between strangers, which can lead to the development of good relationships and better business discussions. Especially, when first meeting a person who speaks a different language, if your identification items are printed on a visiting card in a language the other person can understand, the visiting card helps him/her obtain the correct information about your position, name, and so forth.

Nevertheless, visiting cards are widely used by a great number of people and it is very difficult to keep received cards in good order and thus be able to find the card required without a long search. Accordingly, album type books and file boxes with partitions are available on the market to eliminate the inconvenience in arranging visiting cards stated above. But, even with these seemingly handy tools, it still takes a lot of time and labor to keep received visiting cards in good order. Especially, if a key-word needed for the search should be omitted, one must look for the required visiting card by scanning them all one by one. Also, with the above systems, it is difficult to prepare a list of the staff in a certain Company or to look for an associate who can afford the time to play golf with you, for example.

For the above reasons, a method of manually inputting the identification items on a visiting card to a computer, either by company, section or position, has been developed so that the information on each visiting card can be accessed by the retrieval of the stored data. However, this system requires time and labor for inputting the information on a visiting card, and too much time is wasted and cost incurred. Therefore, the system has not been used as widely as expected.

SUMMARY OF THE INVENTION

Accordingly, it is an object of this invention to provide a visiting card on which identification items can be input without a manual operation, whereby the input is automatically read by an optical means. It is another object of this invention to provide a method of and an apparatus for automatically reading identification items, such as bearer's company name, own name and so on, together with discriminating symbols on the visiting card, simultaneously, and inputting this data to a computer after classifying it into the respective items, so that the retrieval thereof can be made rapidly, correctly and cheaply.

To accomplish the above objects, the inventors have created a visiting card with symbols for discriminating each of the bearer's identification items, such as his/her company name, section name, position title, own name, company address, office telephone number and so on, from others, each of the discriminating symbols being marked on the right of, the left of, above or below each of the identification items in a corresponding manner on the margin of the visiting card, whereby the information on a visiting card becomes automatically readable with an optical means, transmittable to a computer as an electric or optical signal, and can be input after classification into each item. The above and other objects and features of this invention will be more apparent hereinafter from the following description taken in connection with the accompanying drawings, wherein the invention is illustrated by way of examples.

DESCRIPTION OF THE PREFERRED EMBODIMENTS

Figure 1:
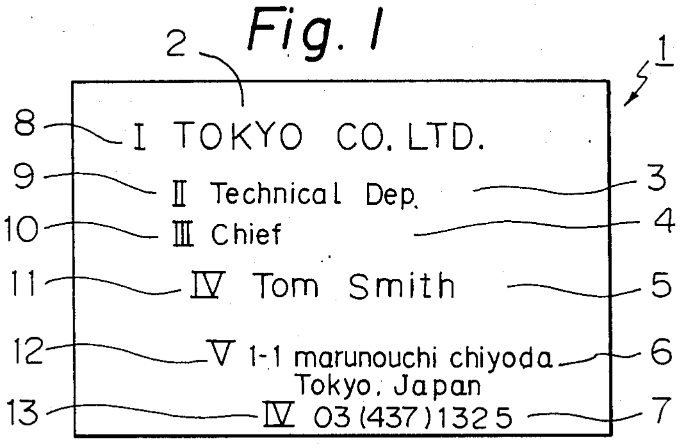
FIG. 1 is an example of a visiting card of this invention with discriminating symbols.

For better understanding, this invention will be described in more detail with reference to the accompanying drawings. In FIG. 1, the numeral 1 denotes a visiting card marked with discriminating symbols of this invention, wherein the bearer's company name 2, department name 3, position title 4, own name 5, office address 6 and telephone number 7 are printed on the visiting card. At first glance, it seems no different from conventional visiting cards, but is, however, different in that it is marked with discriminating symbols 8–13.

The kinds of symbols to be used for discriminating each individual identification item from the other items should be determined in advance. For example, the Roman numeral I can be used to denote the company name and the Roman numeral IV can be used to denote the bearer's name, as FIG. 1 shows, but the same kind of symbols must be used consistently for all of the identification items of the visiting card. Of course, the discriminating symbols may be English alphabet, other foreign language characters, numerals, marks, bar-codes or any other symbols, other than the Roman numerals I, II . . . illustrated in the Figure. For convenience, however, this description will use Roman numerals for the discriminating symbols.

The discriminating symbols I 8 is placed before the bearer's company name 2 "TOKYO CO., LTD.". Similarly, the discriminating symbols II 9, III 10, IV 11, V 12 and VI 13 are put before his department name 3 "Technical Dept.", position title 4 "chief", name 5 "Tom Smith", company address 6 "1-1, Marunouchi, Chiyoda . . . ", and office telephone number 7 "03-274-1325", respectively.

In this connection, when a proper noun is expressed in Chinese characters in Japan or Korea, kana or Hangul characters are often printed at the side of the Chinese characters to indicate the correct pronunciation of the proper noun. In this case, the above discriminating symbols may be also used on the kana or Hangul characters. Further, in these countries, sometimes the Chinese characters are used on one surface of the visiting card, and the English equivalent thereof used on the other surface of the card. In this case, the discriminating symbols should be solely applied to the English equivalent side, because the computer processing of the information obtained therefrom is much easier compared to that obtained from the Chinese characters.

Figure 2:
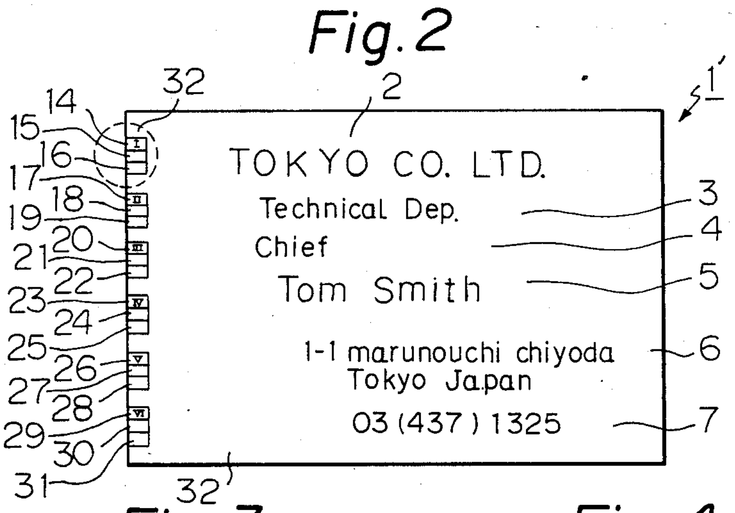
FIG. 2 is another example of a visiting card of this invention with discriminating symbols.
Figure 3:
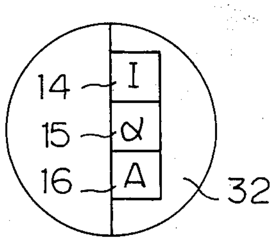
FIG. 3 is a partially enlarged view of the discriminating symbols encircled in FIG. 2.
Figure 4:
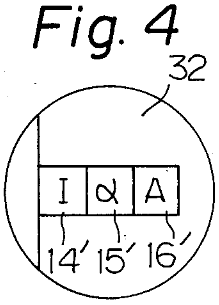
FIG. 4 is another example of discriminating symbols having a different arrangement from those in FIG. 3.

Another example of a visiting card of this invention will be described below to reference with FIGS. 2, 3 and 4. As apparent from FIG. 3, the visiting card 1' of FIG. 2 is not at all different to the conventional card, in that the bearer's company name, own name and so forth are printed in the central part thereof, but the visiting card of this invention has a symbol, different in size and variety, additionally printed on the right of, left of, above or below each of the identification items, respectively, on the margin of the visiting card, to indicate whether the item is his/her company name or own name, for example. More specifically, according to FIG. 3, marked on the left of the company name 2 in the left margin of the visiting card are the following symbols: I 14 indicating that it is the company name 2, α15 for indicating the sort of character used for printing the company name 2, and A 16 indicating the size of the character used for printing the company name 2. In relation to the department name 3, the symbol II 17 indicates that it is the department name 3, β 18 indicates what sort of character is used therefor, and β 19 indicates the size of the character used therefor, and these symbols are marked in the left margin of the visiting card next to the symbols I, α, and A.

Similar to the above, the symbols III 20, γ21, and B 22 are marked in relation to the position title 4; the symbols IV 23, δ 24 and C 25 are marked in relation to his own name 5; the symbols V 26, ξ 27 and B 28 are marked in relation to the company address 6; and the symbols VI 29, θ 30, and B 31 are marked in relation to the office telephone number 7. These symbols may be marked on the same side of the visiting card or may be marked on the different side thereof separately. Additionally, in the marking, one symbol alone may be used for discriminating one identification item from the others or more than one symbol may be used in combination to indicate what sort of or what size character is used or what information the visiting card carries. When employed in combination, the symbols may be arranged in a line as shown in FIG. 3, or may be arranged in a line as shown in FIG. 4.

The symbols to be used for discrimination may be characters of any language, numerals, figures, marks of every kind, bar-codes or any other symbols, so long as they can be differentiated by an optical means. When these symbols marked on a visiting card are read by means of an optical reader, efficient reading can be made by continuously shifting a spotlight from the right to the left or from the top to the bottom of the visiting card as soon as any one of the symbols is detected by a sensor. Still other examples of this invention will be described below in detail with reference to FIGS. 5, 6, and 7.

Figure 5:
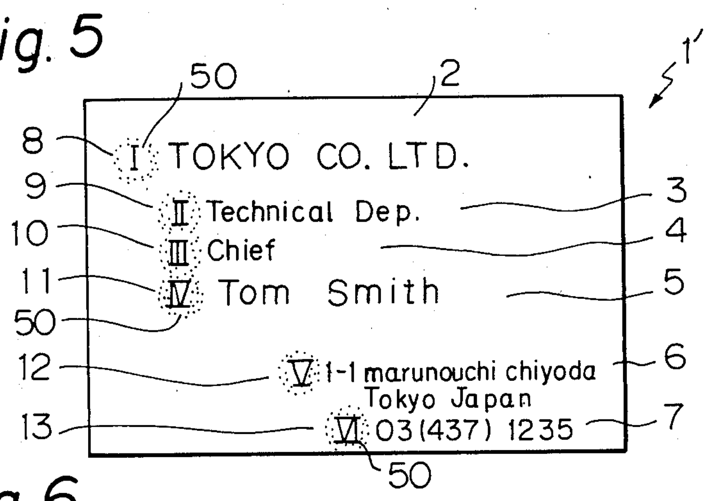
FIG. 5 is still another example of a visiting card of this invention with discriminating symbols covered with discontinuous camouflage print.

A visiting card 1' in FIG. 5, marked with symbols according to this invention, is the same in every respect as the visiting card 1 in FIG. 1, with the exception that camouflage printing 50 has been made on the symbols. Therefore, a description will now be given of the camouflage print, which is different from the symbols in the preceding examples in function.

Figure 6:
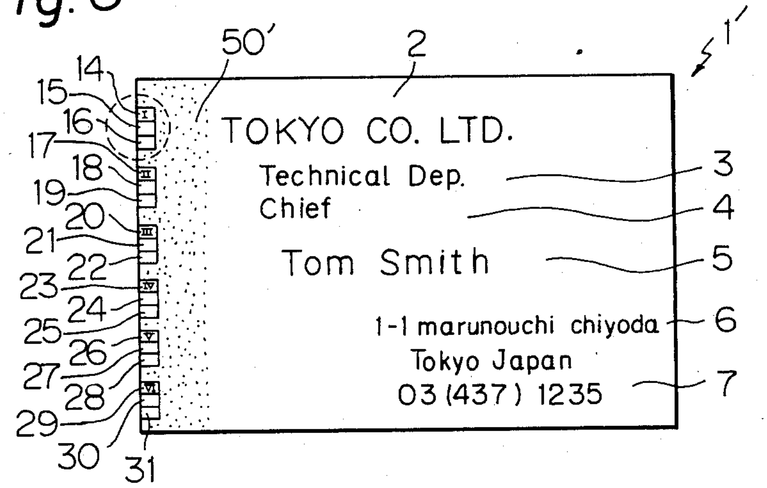
FIG. 6 is a fourth example of a visiting card of this invention with discriminating symbols covered with continuous camouflage print.
Figure 7:
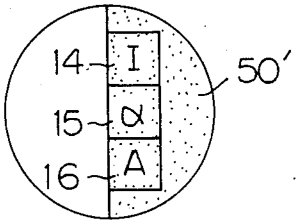
FIG. 7 is a partially enlarged view of the discriminating symbols encircled in FIG. 6.

The camouflage printing 50 is made on the visiting card 1' in such a way that the symbols 8–13 are covered therewith discontinuously or continuously. Moreover, a color to be used for the camouflage printing must be a dropout color that can be detected only by an optical means. The visiting card 1' in FIGS. 5 and 6 is all the same as the visiting card 1' stated above with reference with FIG. 2, with the exception that camouflage printing 50' covers the symbols. Therefore, the description will now be given of the camouflage printing 50'.

The camouflage printing 50, 50' in FIGS. 5 and 6 is made essentially in the same way, except that the former is made discontinuously and the latter is made continuously, so as to cover the symbols. Also, as in the preceding example, the color to be used for camouflage printing must be a color that can be discriminated from the colors used for printing the identification items and the symbols, by an optical means. A primary object of the camouflage printing 50, 50' is to conceal the discriminating symbols, but the effect of the camouflage printing is not limited to only hiding the symbols; it can be expanded to amusing receivers of the visiting card with the bearer's own favorite pictures, such as flowers, animals, cars, ships or even a popular idol appearing in animation.

The ink employed for the camouflage printing is available on the market under the general name of Drop-out Color Ink. Concretely, an ink described in "Special Printing" p. 234, by Kazuo Matumoto, published on July 15, 1983 by Insatsu Shuppan Kenkyusho, is used for the camouflage printing. Other than that, an ink having a color which is complementary to the color of the discriminating symbols may be used in the camouflage printing.

Now, with reference to FIGS. 8 to 13, a method of and an apparatus for optically reading the identification items 2–7 and the discrimination symbols 8–13 or 14–31 on the visiting cards 1, 1' will be described below in detail.

Figure 8:
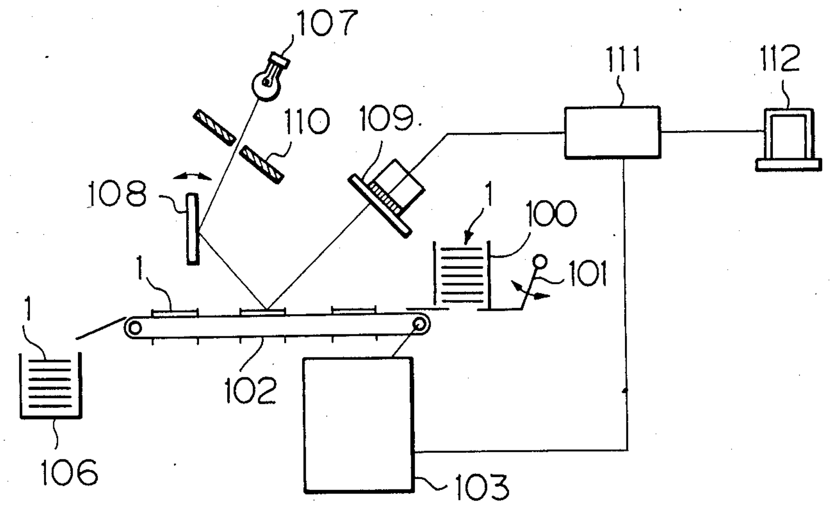
FIG. 8 is a schematic illustration of a method and an apparatus of this invention for reading information on a visiting card of this invention.

FIG. 8 is a schematic illustration of a method and an apparatus of this invention for optically reading information marked on a visiting card of this invention. Particularly, the visiting cards 1, 1' of this invention, marked with discrimination symbols, is placed in a feed box 100 and fed onto a conveyor 102 one by one by means of a feeder 101. An incandescent lamp or a lamp 107 emitting a light with a certain wave length is used as a light source of an optical character reader. The light, emitted from the light source, passes through a slit 110, and reaches a rotatably supported reflector 108, whereby the reflection angle of the light is adjusted so that the light can strike the visiting cards 1, 1' on the moving conveyor 102. The light, reflected back from the visiting cards, 1,1', is received by a light-receiving element or photoelectric sensor 109 and converted to an ON-OFF electric signal in order to be stored in the memory of an internal/external computer 111 in the form of characters, numerals, marks, and the like. Further, the light is converted to a binary signal by the scanning of a facsimile or an image-sensor, the signal is then transmitted through communication cables to the computer 111, by which it is subjected to character recognition so that the memory can store the symbol after classifying it into the bearer's company name, own name and so on 2–7.

The information on the visiting card thus stored can be retrieved by means of a terminal unit 112 connected with the computer 111, and accordingly, the correct information on whatever identification item he/she may require is always accessible.

In connection with the function stated above, the principle of the optical reader for the visiting card will be described below in detail.

First, a description will be given of the visiting card on which discriminating symbols are marked in a common ink readable with visible light; the visiting card of this kind is hereinafter referred to as the a-type visiting card. Where the discriminating symbols are printed in an ink of essentially same color as that in which the identification items 2–7 are printed, a common optical character reader available on the market can be used for the reading.

Figure 10:
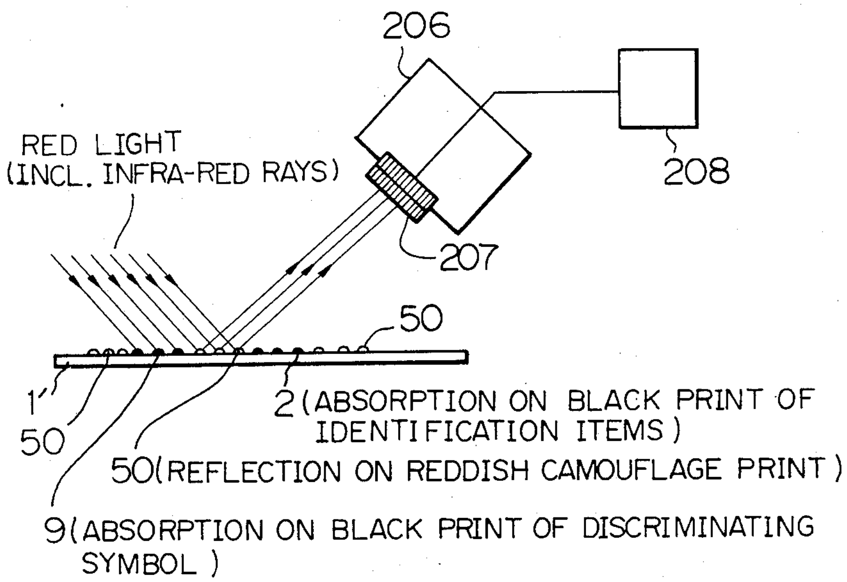
FIG. 10 is a partially enlarged schematic illustration of an apparatus of this invention for reading information on a visiting card of this invention.
Figure 11:
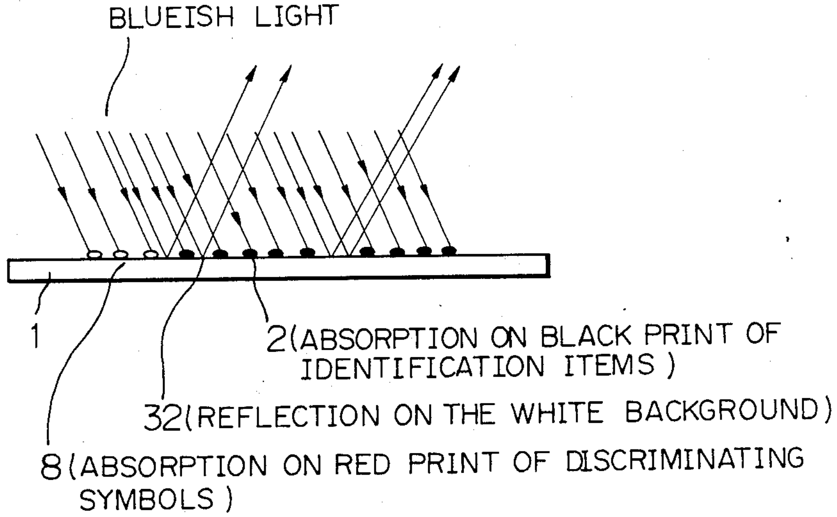
FIGS. 11, 12 and 13 are illustrations showing the principle of optical reading of this invention.

Second, where the identification items 2–7 are printed in black ink and the discrimination symbols are printed in an ink of prescribed non-black color (the visiting card of this kind is hereinafter referred to as the b-type visiting card.), a light that will be absorbed by the non-black ink is employed for the illumination. For example, if the discrimination symbols are printed in a reddish ink, then a blueish light is employed for illuminatio. In this case, both the discrimination symbols, printed in a reddish ink, and the identification items, printed in black ink, absorb the blueish light, whereas the white background, where nothing is printed, reflects it. Therefore, as shown in FIG. 10, a photoelectric sensor 207 is not excited at all, or only a little if excited, by the light reflected back from the printed portions because the reflected light is too weak to reach the photoelectric sensor or does not reach it at all. Accordingly, the sensor is kept in the OFF condition as long as the light is sweeping the printed portion, but is placed in the ON condition, i.e., excited, when the light is sweeping the white background of a visiting card 32; thus, an ON-OFF signal appears, whereby characters, numerals, marks and the like are read upon recognition.

Of course, in the case of a visiting card having discrimination symbols printed in a blueish ink (the visiting card of this kind is hereinafter referred to as the c-type visiting card.), a similar phenomena occurs by the illumination of a reddish light, thus the discrimination symbols, as well as the identification items, can be read optically.

Moreover, in the case of a visiting card having discrimination symbols printed in an ink invisible to the naked eye but recognizable by an optical means, the discrimination symbols can be also optically read by means of a light that is absorbed by the ink, such as infrared or ultraviolet rays. This kind of ink is well known; for example, an ink or substance containing rutile ($TiO_2$) or infrared ray-absorbing zinc oxide powder glass, or benzophenone-, or a benzotrialzole-based ultraviolet-absorbing agent or manganese complex of 4-hydroxy-3-benzene sulphonic acid, or chemical products of Nippon Kayaku Co., Ltd., such as IR-750, IRG-002, IRG-003, etc., can be used as the ink for this invention.

Figure 12:
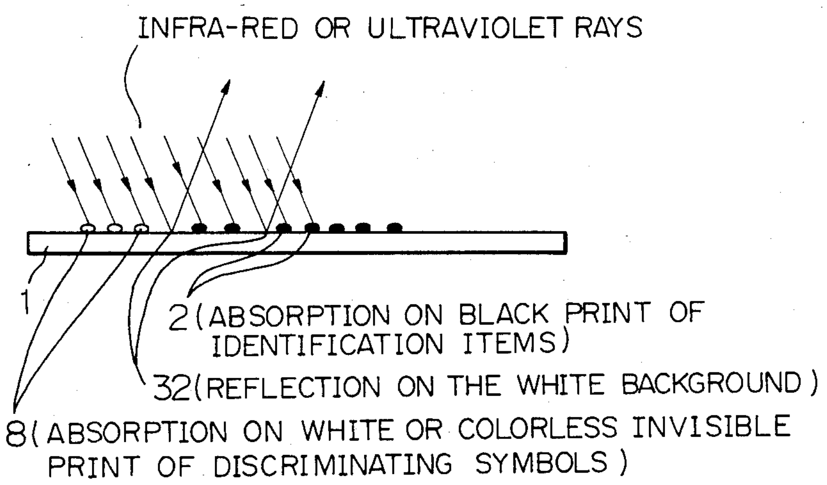

In the case of a visiting card having discrimination symbols printed in this kind of ink (this visiting card is hereinafter referred to as the d-type visiting card.), infrared or ultraviolet rays should be used for illumination. As shown in FIG. 12, this kind of invisible light is absorbed, upon illumination, by the white or color lens discrimination symbols 8 and the identification items 2, but is reflected from the background of the visiting card where nothing is printed, thereby exciting the photosensor and allowing the information on the visiting card to be read.

Figure 13:
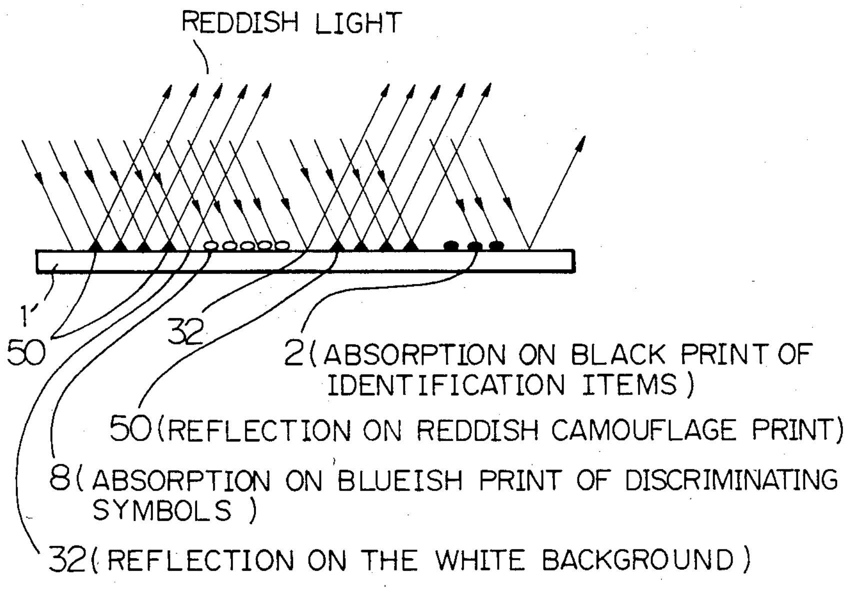

Reference will now be made to FIGS. 5 and 6 showing camouflage printing made on the discriminating symbols, and a method and an apparatus of this invention for optical reading according to FIG. 13.

Where the camouflage printing is made in the same color all over a visiting card (a visiting card of this kind is hereinafter referred to as the e-type visiting card.), a light source that emits monochromatic light, which is reflected by the color of camouflage print 50, 50' and absorbed by the color of the discrimination symbols 8–13, 14–31 and the identification items 2–7, is used as the illumination for optical reading. Since the light striking on the discrimination symbols and the identification items is almost entirely absorbed thereby, the reflected light is nil or extremely weak, and consequently, the photoelectric sensor is little excited and kept in the OFF condition. In contrast, the light reflected on the camouflage print 50, 50' and the white background is strong enough to excite the photoelectric sensor and keep it in the ON condition, and thus characters, numerals, figures or marks can be read by an optical reader.

Characters, numerals and the like of the identification items must be printed in a black ink when the camouflage printing is made on a visiting card in various colors, and in addition, the color of the camouflage print and the color of the discrimination symbols 8–13, 14–31 must be composed of such coloring materials able to be differentiated by an optical means. That is, when the discriminating symbols are printed in a blueish ink, the camouflage print should be made in a reddish ink. Conversely, when the discriminating symbols are printed in a reddish ink, the camouflage print should be made in a bluish ink. The reading principle in this case is the same as that of the examples in FIGS. 11 and 12, so that a description thereof is omitted. However, a method and an apparatus for optical reading in the system are a little different from those mentioned above, and only the differences thereof will be described.

Figure 9:
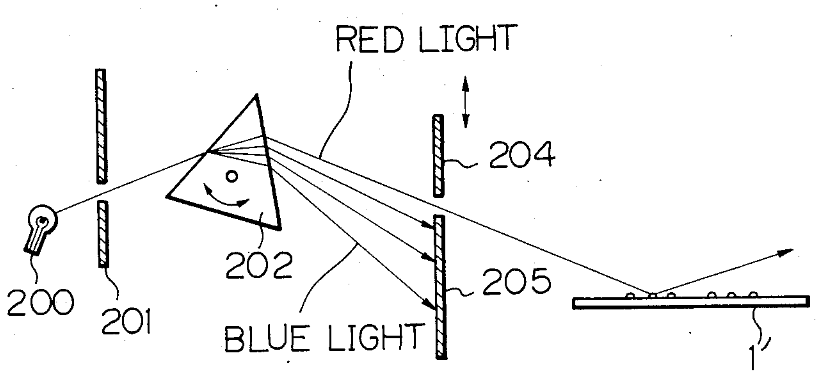
FIG. 9 is a schematic illustration of an optical path of the illumination for reading information on a visiting card of this invention.

FIG. 9 shows a light source of an optical reader used in this case. A light emitted from an incandescent lamp 200 passes through a slit 201 and falls on a prism 202, whereby the light is separated into various spectral components. A second slit 205 on an intercepting board 204 on the other side of the prism allows only a light with a certain wave length for the optical reading to pass through and fall on the visiting cards 1, 1' having discrimination symbols. Since a light with an appropriate wave length must be separated for the optical reading, either the angle of the prism 202 to the incident light must adjustable by rotation or the position of the second slit 205 on the intercepting board 204 must be adjustable in the upper or the lower direction. In this way the wave length of the light can be confined to a narrow range at will, in compliance with the color of the camouflage print 50 on the visiting cards 1, 1'. With this mechanism, the information on a visiting card, even though it is printed in a variety of colors, can be read by the absorption of the light, attributed to the identification items 2 and the discrimination symbols 9 printed thereon, and by the reflection of the light, attributed to the camouflage print 50 and the white background 32 of the visiting card, as shown in FIG. 10. That is, the portion where the light is absorbed does not send enough reflection light to excite the photoelectric sensor, which remains in the OFF condition. On the other hand, the portion where the light is reflected sends enough light to excite the photoelectric sensor and bring it to the ON condition, and thus the characters, numerals, figures, marks, and any other symbol used in the discrimination symbols 8–13, 14–31 and the identification items 2–7 can be read in an optical manner. The data read by a photoelectric sensor 207 of an optical means 206 is transmitted in the form of binary electric or optical signals and a computer 208 inputs them to a memory. Therefore, the information input from a visiting card can be output at any time from the computer 208 when required.

As is obvious from the above, according to this invention, the information on a visiting card, such as identification items and discrimination symbols, can be automatically read by an optical means, without the need for a manual operation. Moreover, the read information can be input to a computer, swiftly, correctly and cheaply after being classified into the bearer's company name, own name, company address, and the like.

The input of correct information input classified into each of the identification items can be retrieved by the use of a computer, and thus a correct output can always be obtained for the identification item required, either singly or in combination.

In this invention, the term "an optical means" is intended to denote an optical character reader (OCR), facsimile, or photocopier of all types. Moreover, the term "a computer" is intended to denote not only a large-sized computer but also desk-top types, such as a microcomputer, minicomputer, and family computers of all types.

While this invention has been illustrated and described in accordance with a preferred embodiment, it is recognized that variations and changes may be made and equivalents employed herein without departing from the invention as set forth in the claims.

What is claimed is:

1. A visiting card with symbols for discriminating a bearer's preprinted identification items, each of said discriminating symbols being printed in alignment with one of said identification items by an ink invisible to the human eye and recognizable by an optical means for reading the items, the symbols for discriminating the identification items being adapted for use by an automatic card reading apparatus in discriminating and classifying the identification items.

2. A visiting card according to claim 1, in which the ink has a property of reacting with light in one of the infra-red and ultraviolet regions.

3. A rectangular visiting card according to claim 1, in which each of the discriminating symbols is assigned a first sub-symbol to indicate the type of character to be used in printing and a second sub-symbol to indicate the size of character to be used in printing.

4. A visiting card, according to claim 1, in which camouflage printing is made thereon so as to cover at least said discriminating symbols and said camouflage printing substance contains an ink of a color that will reflect light from a light source of an optical means.

5. A rectangular visiting card with four margins and having a number of preprinted identification items which are discriminated from each other by a corresponding number of discriminating symbols, each of the discriminating symbols being printed with an ink that is invisible to the human eye and that absorbs light in one of the infra-red and ultraviolet regions, the discriminating symbols being located on one of the margins of the visiting card in a manner corresponding to the identification items.

6. A rectangular visiting card according to claim 5, wherein each of the discriminating symbols is assigned a first sub-symbol to indicate the type of character to be used in printing the identification items and a second sub-symbol to indicate the size of character to be used in printing the identification items.

7. A visiting card for use with an automatic card reader having means for maching reading information, the card comprising:

a plurality of groups of preprinted machine readable identification data, each group including a different type of identification data; and a preprinted discrimination symbol aligned with each different group of identification data and discriminating the group aligned therewith from the remaining groups on the basis of the type of identification data included therein to permit the identification data to be automatically discriminated and classified by the card reader.

8. A visiting card according to claim 7, wherein each of the preprinted discrimination symbols is assigned a first sub-symbol to indicate the type of character to be used in printing the group of identification data aligned with said discrimination symbols and a second sub-symbol to indicate the size of character to be used in printing the group of identification data aligned with said discrimination symbol.

* * * * *